United States Patent
Maisano et al.

(10) Patent No.: US 12,516,102 B1
(45) Date of Patent: Jan. 6, 2026

(54) PROCESS FOR THE PURIFICATION OF SOLUBLE PSGL-1 PROTEIN VARIANTS

(71) Applicant: Bracco Suisse SA, Cadempino (CH)

(72) Inventors: Federico Maisano, Lodi (IT); Federico Crivellin, Caselle Torinese (IT)

(73) Assignee: Bracco Suisse SA, Cadempino (CH)

( * ) Notice: Subject to any disclaimer, the term of this patent is extended or adjusted under 35 U.S.C. 154(b) by 1857 days.

(21) Appl. No.: 16/483,940

(22) PCT Filed: Feb. 6, 2018

(86) PCT No.: PCT/EP2018/052889
§ 371 (c)(1),
(2) Date: Aug. 6, 2019

(87) PCT Pub. No.: WO2018/146067
PCT Pub. Date: Aug. 16, 2018

(30) Foreign Application Priority Data

Feb. 9, 2017 (EP) .................................... 17155366

(51) Int. Cl.
*C07K 14/705* (2006.01)

(52) U.S. Cl.
CPC .... *C07K 14/70596* (2013.01); *C07K 2319/01* (2013.01)

(58) Field of Classification Search
None
See application file for complete search history.

(56) References Cited

U.S. PATENT DOCUMENTS

| | | | |
|---|---|---|---|
| 5,827,817 A | 10/1998 | Larsen et al. | |
| 6,277,975 B1 | 8/2001 | Larsen et al. | |
| 6,933,370 B2* | 8/2005 | Coffman ................ | C07K 1/18 530/350 |
| 7,122,641 B2* | 10/2006 | Vedantham ............. | C07K 1/16 530/391.1 |
| 8,058,407 B2 | 11/2011 | Sun et al. | |
| 11,370,826 B2 | 6/2022 | Maisano et al. | |
| 11,905,323 B2 | 2/2024 | Maisano et al. | |
| 2008/0274501 A1* | 11/2008 | Zhang ..................... | C07K 1/36 530/421 |

FOREIGN PATENT DOCUMENTS

| | | |
|---|---|---|
| EP | 1681298 A2 | 7/2006 |
| EP | 1681299 A2 | 7/2006 |
| EP | 1893751 B1 | 3/2013 |
| WO | 2001072769 A2 | 10/2001 |
| WO | 2010051360 A1 | 5/2010 |
| WO | 2014159441 A1 | 10/2014 |

OTHER PUBLICATIONS

Sigma-Aldrich. Q Sepharose Fast Flow. Datasheet [online]. Reviewed on Jan. 2022. Product information; pp. 1-2. Downloaded from: <https://www.sigmaaldrich.com/deepweb/assets/sigmaaldrich/product/documents/289/859/q1126pis-ms.pdf> (Year: 2022).*
Takada, M. et al. 1997. The cytokine-adhesion molecule cascade in ischemia/reperfusion injury of the rat kidney. Journal of Clinical Investigations 99: 2682-2690; specif. p. 2683 (Year: 1997).*
Cummings, R.D., "Structure and function of the selectin ligand PSGL-1," Braz. J. Med. Biol. Res., 32(5): 519-528 (1999).
European Search Report for European App. No. 17155366.2, mailed Jul. 25, 2017.
International Search Report and Written Opinion for PCT/EP2018/052889, mailed Apr. 24, 2018.
Li, F. et al., "Post-translational Modifications of Recombinant P-selectin Glycoprotein Ligand-1 Required for Binding to P- and E-selectin," J. Biol. Chem, 271:3255-3264 (1996).
Sako, D. et al., "A Sulfated Peptide Segment at the Amino Terminus of PSGL-1 Is Critical for P-Selectin Binding," Cell, 83: 323-331 (1995).
Takada, M., et al. "The cytokine adhesion molecule cascade in ischemia/reperfusion injury of the rat kidney," J. Clin. Invest., 99(11):2862-2690 (1997).

* cited by examiner

*Primary Examiner* — Adam Weidner
*Assistant Examiner* — Sharon M. Papciak
(74) *Attorney, Agent, or Firm* — VIVICAR Law, PLLC

(57) ABSTRACT

The present invention discloses a method for the purification of highly acidic recombinant proteins. The acidic protein is preferably the extracellular region of PSGL-1 or fusion and/or chimeric proteins comprising this soluble portion. Purification is a three-steps chromatography which comprises separation on an Anion Exchange solid-phase, a Hydrophobic Interaction and a Hydroxyapatite. Purity and yields are optimal and the process can be easily scaled up and automated.

18 Claims, 3 Drawing Sheets
Specification includes a Sequence Listing.

SEQUENCE LISTING

```
<160> NUMBER OF SEQ ID NOS: 4

<210> SEQ ID NO 1
<211> LENGTH: 101
<212> TYPE: PRT
<213> ORGANISM: Artificial Sequence
<220> FEATURE:
<223> OTHER INFORMATION: Description of Artificial Sequence: Synthetic
      Variant 1A polypeptide
<220> FEATURE:
<221> NAME/KEY: MOD_RES
<222> LOCATION: (5)..(5)
<223> OTHER INFORMATION: SULFATATION
<220> FEATURE:
<221> NAME/KEY: MOD_RES
<222> LOCATION: (7)..(7)
<223> OTHER INFORMATION: SULFATATION
<220> FEATURE:
<221> NAME/KEY: MOD_RES
<222> LOCATION: (10)..(10)
<223> OTHER INFORMATION: SULFATATION
<220> FEATURE:
<221> NAME/KEY: CARBOHYD
<222> LOCATION: (16)..(16)
<223> OTHER INFORMATION: Sialyl-Lewis -X (O-Glycan)
<220> FEATURE:
<221> NAME/KEY: MOD_RES
<222> LOCATION: (90)..(90)
<223> OTHER INFORMATION: SULFATATION
<220> FEATURE:
<221> NAME/KEY: MOD_RES
<222> LOCATION: (100)..(100)
<223> OTHER INFORMATION: Lys or Cys

<400> SEQUENCE: 1

Gln Ala Thr Glu Tyr Glu Tyr Leu Asp Tyr Asp Phe Leu Pro Glu Thr
1               5                   10                  15

Glu Pro Pro Glu Met Leu Arg Asn Ser Thr Asp Thr Thr Pro Leu Thr
            20                  25                  30

Gly Pro Gly Thr Pro Glu Ser Thr Thr Val Glu Pro Ala Ala Arg Pro
        35                  40                  45

His Thr Cys Pro Pro Cys Pro Leu Gln Gln Arg Arg Gly Leu Glu Ala
    50                  55                  60

Glu Arg Ala Arg Leu Ala Ala Gln Leu Asp Ala Leu Arg Ala Glu Val
65                  70                  75                  80

Ala Arg Leu Ala Arg Glu Arg Asp Leu Tyr Gly Gly Gly Ala Gly
                85                  90                  95

Gly Gly Gly Xaa Gly
            100

<210> SEQ ID NO 2
<211> LENGTH: 118
```

```
<212> TYPE: PRT
<213> ORGANISM: Artificial Sequence
<220> FEATURE:
<223> OTHER INFORMATION: Description of Artificial Sequence: Synthetic
      Chimeric PSGL-1-NRL protein
<220> FEATURE:
<221> NAME/KEY: MISC_FEATURE
<222> LOCATION: (1)..(4)
<223> OTHER INFORMATION: This region may encompass 1-4 residues
<220> FEATURE:
<221> NAME/KEY: MISC_FEATURE
<222> LOCATION: (5)..(16)
<223> OTHER INFORMATION: Selectin binding region
<220> FEATURE:
<221> NAME/KEY: MISC_FEATURE
<222> LOCATION: (17)..(47)
<223> OTHER INFORMATION: This region may encompass 1-31 residues
<220> FEATURE:
<221> NAME/KEY: MOD_RES
<222> LOCATION: (48)..(53)
<223> OTHER INFORMATION: Any amino acid other than Cys
<220> FEATURE:
<221> NAME/KEY: MISC_FEATURE
<222> LOCATION: (48)..(53)
<223> OTHER INFORMATION: This region may encompass 1-6 residues
<220> FEATURE:
<221> NAME/KEY: MOD_RES
<222> LOCATION: (55)..(60)
<223> OTHER INFORMATION: Any amino acid other than Cys
<220> FEATURE:
<221> NAME/KEY: MISC_FEATURE
<222> LOCATION: (55)..(60)
<223> OTHER INFORMATION: This region may encompass 1-6 residues
<220> FEATURE:
<221> NAME/KEY: MOD_RES
<222> LOCATION: (61)..(61)
<223> OTHER INFORMATION: Any amino acid
<220> FEATURE:
<221> NAME/KEY: MISC_FEATURE
<222> LOCATION: (62)..(67)
<223> OTHER INFORMATION: This region may encompass 1-6 residues
<220> FEATURE:
<221> NAME/KEY: MISC_FEATURE
<222> LOCATION: (90)..(96)
<223> OTHER INFORMATION: This region may encompass 1-7 residues
<220> FEATURE:
<221> NAME/KEY: MOD_RES
<222> LOCATION: (97)..(116)
<223> OTHER INFORMATION: Gly, Ser, Pro, Ala, Val or

```
Ala Leu Arg Ala Glu Val Ala Arg Leu Ala Arg Glu Arg Asp Leu Tyr
                85                  90                  95

Xaa Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa
        115

<210> SEQ ID NO 3
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Pyroglutamic acid

<400> SEQUENCE: 3

Xaa Ala Thr Glu Tyr Glu Tyr Leu
1               5

<210> SEQ ID NO 4
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Thr Cys Pro Pro Cys Pro Leu
1               5
```

PROCESS FOR THE PURIFICATION OF SOLUBLE PSGL-1 PROTEIN VARIANTS

CROSS-REFERENCE TO RELATED APPLICATIONS

This application is the national stage application of corresponding international application number PCT/EP2018/052889, filed Feb. 6, 2018, which claims priority to and the benefit of European application no. 17155366.2, filed Feb. 9, 2017, all of which are hereby incorporated by reference in their entirety.

SEQUENCE LISTING

The instant application contains a Sequence Listing which has been filed electronically in ASCII format and is hereby incorporated by reference in its entirety. Said ASCII copy, created on Oct. 11, 2019, is named 01122_0064_SL.txt and is 4,604 bytes in size.

FIELD OF THE INVENTION

The present invention relates to the field of recombinant protein purification, in particular of anionic protein purification for in vivo applications.

STATE OF THE ART

The purification of recombinant proteins from eukaryotic expression systems is a very challenging issue. It has been estimated that downstream processing, which includes extraction, purification and characterization of a target protein, may account for 80% or more of the overall production cost. It is also true that the achievement of satisfactory purification yields and purity levels may greatly delay the preliminary studies required to understand the potential of any newly designed, isolated, recombinant protein.

In fact, even though recombinant proteins are generally expressed and secreted at very high levels into the culture medium, cell growth at high density is responsible for the presence of contaminating proteins and large size molecules other than the protein of interest in the conditioned medium, which may greatly impact on purification processes and yields.

In fact, cellular debris, proteins and their degradation products as well as nucleic acids derived from cell lysis occurring during growth, are usual contaminants a purification method has to deal with.

Among recombinant protein purification methods, affinity ones carried out with antibodies or other proteins (i.e. Protein-A) that do specifically recognize the protein of interest over complex mixtures, are the most selective and, at least theoretically, those providing higher purities. Although quite diffused for the purification of recombinant proteins, these methods hide anyhow the risk of leakage of the affinity ligand from the purification column itself and, along with that, of the immunogenicity of these proteic contaminants.

The complex post-translational modification pattern of the P-selectin glycoprotein ligand-1 (PSGL-1), where two distinct post-translational modifications for the $Ca^{2+}$-dependent recognition by the lectin domain of P-selectin (tyrosine sulfation and a specific core 2 O-linked glycosylation by fucose and sialic acid) are necessary, requires an eukaryotic expression system for its functional production.

PSGL-1 is a negatively charged protein, due to the presence of at least 3 tyrosines in the extracellular region, sulfated in the functional protein. A heavy glycosylation pattern and the presence of sialic acid in the extracellular region of the functional protein further contribute to its negative charge.

PSGL-1 is a leukocyte adhesion molecule that mediates cell tethering and rolling on activated endothelium cells under physiological blood flow. This activity is an important initial step in leukocyte extravasation. PSGL-1 was initially identified as a ligand for P-selectin, and subsequent work has revealed that PSGL-1 is also a ligand for E-selectin and L-selectin (see, e.g., U.S. Pat. No. 6,277,975).

The possible use in diagnostic systems in vivo and the complex post-translational requirements necessary for its functional expression represent thus a quite challenging issue.

The expression of the extracellular domain of PSGL-1 has been disclosed in several recombinant systems, mostly as a chimeric protein with partners able to induce dimer formation, which represents the functional form.

U.S. Pat. No. 5,827,817 describes the preparation of a recombinant protein where the soluble form of PSGL-1 (sPSGL-1) corresponding to the extracellular domain of the mature protein (aa 42-320), is fused in frame with the Fc portion of an IgG, resulting in a dimeric protein which binds P and E-selectins and is post-translationally modified.

In the same patent, Example 14, it is also disclosed the purification of this recombinant product by a strong anion exchange chromatography followed by a low salt elution and lectins affinity chromatography (due to their affinity for glycans).

Alternatively, a purification on a Protein A-matrix, to which the Fc portion of the chimeric protein binds, is described in U.S. Pat. No. 6,933,370. This chromatography is said to present the (expected) drawbacks, mainly due to Protein A leakage from the column.

EP 1681298 and EP 1681299 deal with the purification of recombinant soluble forms of PSGL-1 and the technical problem of removing contaminating DNA from the protein of interest. The goal is said to be achieved by an anion exchange chromatography, followed by a hydrophobic interaction solid phase chromatography and by either washings with a high-salt, hydroalcoholic solution, or alternatively, by a metal chelate chromatography.

WO01/72769 A2 discloses methods for the purification of PSGL-1 or PSGL-1 fusion proteins, carried out by subjecting those proteins to anion exchange chromatography followed by hydrophobic interaction chromatography.

Documents WO2014/159441 A1 and WO2010/051360 A1 disclose methods for the purification of proteins, using steps of various chromatography methods.

Takada M. et al. in J. Clin. Invest., 1997, 99(11):2862-2690, describes the use of recombinant soluble PSGL-1 to investigate acute and long term graft rejection in a kidney injury ischemia/reperfusion rat model, where sPSGL-1 is said to reduce renal damage. The protein is purified by anion exchange, hydroxyapatite and size-exclusion chromatography.

The different alternative purification methods described in the literature do not address, however, both the technical problems of: a) achieving a purity level suitable for in vivo applications and b) achieving a purification method suitable for an industrial scale-up.

The present invention addresses and solves both problems, achieving a soluble PSGL-1 with purity suitable for "in vivo" uses, both from DNA and other proteins, and a purification process suitable for large scale preparations.

This result has been achieved by the following sequence of chromatographic steps: anionic exchange (AE), hydrophobic interaction (HI) and hydroxyapatite (HA) as the last chromatographic step. This was not obvious over the known prior art.

SUMMARY OF THE INVENTION

The present invention refers to a method for purifying a target soluble protein comprising the mature extracellular form of P-Selectin Glycopotein Ligand-1 (PSGL-1 GenBank Acc. N. Q14242.1) at the N-terminus, said method comprising submitting a mixture comprising the target soluble protein to:

a) a strong anion exchange column chromatography,
b) a hydrophobic interaction column chromatography and
c) a hydroxyapatite column chromatography, wherein said chromatographies are performed in the indicated order.

The strong ion exchange chromatography comprises loading the mixture, which comprises the target soluble protein (usually a cell culture conditioned medium where the protein has been formerly secreted during cell growth), on a strong anion exchange (AE) in combination with a buffer selected from the group consisting of: Tris, Tricine, Triethanolamine, HEPES, TES, MOPS and phosphate. According to a preferred aspect, the buffer is Tris or phosphate in concentration below 30 mM and with a pH comprised from 6.5 to 8, more preferably from 6.8 to 7.8, even more preferably comprised from 7.4 to 7.8.

The target protein is eluted from the AE with a NaCl or KCl saline solution under isocratic elution or positive gradient elution by increasing concentration of the saline solution up to 1M. The AE eluted material is then loaded on a hydrophobic interaction solid phase for the second chromatographic step, wherein said HI solid phase preferably carries phenyl-hydrophobic functional groups.

Said loading is performed by combining the AE eluted material comprising the target soluble protein with a buffer comprising a high salt concentration, wherein salts are selected from the group consisting of: NaCl, ammonium sulfate and potassium sulfate. According to a preferred embodiment the buffer is Tris in concentration below 100 mM and the salt is NaCl.

The target protein is eluted from the hydrophobic interaction (HI) chromatography by lowering the NaCl concentration in the buffer solution, below 2.5 M.

The buffer in the HI eluted material is then brought to a concentration below 15 mM and a pH from 6.5 to 8 and loaded on a HA column.

Preferably, said buffer is Tris or phosphate with a pH from 6.6 to 7.4.

More preferably, the buffer is phosphate wherein $CaCl_2$ is added in a concentration below 0.5 mM, preferably about 0.3 mM.

Alternatively, said buffer is Tris, with the same pH range as above and preferably comprising $MgCl_2$.

Even more preferably, $MgCl_2$ has a concentration below 1.5 mM, preferably about 1.2 mM.

The preferred buffer concentration, composition and pH, is achieved by submitting the HI eluate comprising the target protein to dilution or diafiltration, before loading it onto the HA solid phase column for the third chromatographic step. After this chromatography, the target protein is either found in the Flow-Through, or alternatively eluted by increasing the phosphate ion concentration above 15 mM, wherein said increase is preferably carried out by a phosphate concentration gradient.

The purification method of the present invention is applied to soluble target proteins comprising at least aa 5-16 of the mature form of PSGL-1 (GenBank Acc. N. Q14242.1) at the N-terminus.

More preferably, it further comprises at least aa 187-208 of the Neural Retina Specific Leucine zipper protein (NCBI Acc. N: NP_0061681), or an amino acid sequence 90% homologous to aa 187-208.

Even more preferably, said soluble target protein comprises at the N-terminus, at least aa 1-19 or 1-47 of the mature extracellular form of PSGL-1 (GenBank Acc. N. Q14242.1), at least aa 187-208 of the Neural Retina Specific Leucine zipper protein (NCBI Acc. N: NP_0061681) and a covalent dimerization domain comprising at least one Cys suitable for a disulfide bridge.

A general and a preferred embodiment of the soluble target protein is represented in the sequence listing, respectively as SEQ ID NO:2 or SEQ ID NO:1.

DETAILED DESCRIPTION OF THE INVENTION

Definitions

Figure 1:
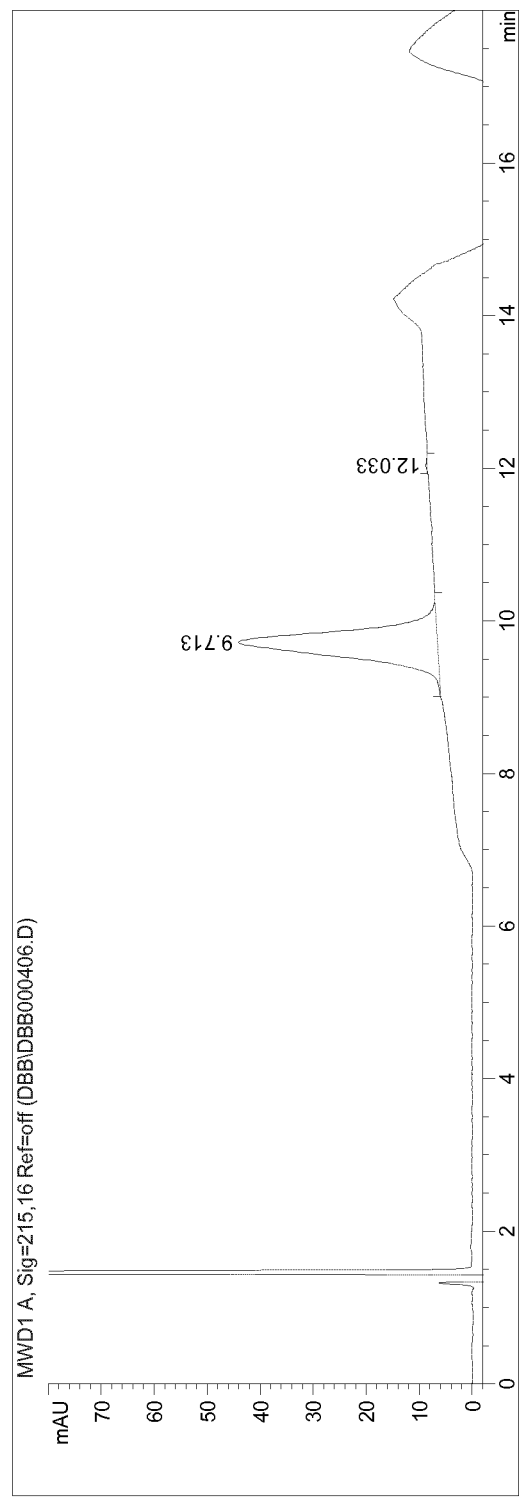
FIG. 1. RP-HPLC analysis, at 215 nm, of the final pool of fractions after HA purification of example 2. The Retention time (Rt) of the target protein is about 9.7 min.

The expressions "solid matrix", "solid support" and "resin" are intended to include any kind of solid phase support or matrix suitable for the attachment of functional groups useful to allow binding of the target protein to a stationary phase, also called solid support on the following. The stationary phase comprises a matrix and the functional groups to which the target protein (or the contaminants) selectively binds. The matrix binds, usually by covalent bonds, the functional groups.

By "anion exchange solid phase chromatography" (AE) is meant a stationary phase that comprises cationic groups as functional groups, such as diethylaminoethyl (DEAE), trimethylammoniumethyl (TMAE) and quaternary ammonium. Preferred AE functional groups are strong anion-exchange groups; more preferred are quaternary ammonium ions or similar positively charged functional groups.

By "hydrophobic interaction solid phase" (HI) is meant a stationary phase that has hydrophobic groups as functional groups. Examples of hydrophobic functional groups are: butyl, octyl, phenyl groups or the like.

By "Hydroxyapatite (or Hydroxylapatite) chromatography" (HA) is meant a chromatography on a Calcium Phosphate form with formula $Ca_5(PO_4)_3(OH)$, also identified as $Ca_{10}(PO_4)_6(OH)_2$ formula, that denotes a crystal unit cell comprising two entities. For chromatographic purposes, HA is preferably Ceramic HA (Type I or Type II).

By "HPLC" is meant a High Performance or High Pressure Liquid Chromatography system for analytical or preparative purpose. By RP-HPLC is meant a reverse phase HPLC technique used to analyze the recombinant protein samples, preferably using phenyl or C4 columns.

By "Low phosphate buffer" is meant a solution with phosphate ion concentration comprised from 2 mM to 15 mM, preferably about 5 mM, as will be better detailed in the Description. An example of low phosphate buffer is obtained by dissolving 0.69 g $NaH_2PO_4$ in 1 Liter $H_2O$. The Low phosphate buffer may comprise salts such as $MgCl_2$ or $CaCl_2$, in concentration comprised from 0.1 to 1.2 mM, preferably about 1 mM, in case of $MgCl_2$ and from 0.1 mM to 1 mM, preferably 0.3 Mm, in case of $CaCl_2$.

By "soluble target protein" is meant a recombinant highly anionic protein, preferably the soluble form of P-selectin Glycoprotein Ligand 1 (PSGL-1), more preferably expressed as a chimeric or fusion protein, wherein the selectin binding region comprises at least amino acids 5-16 of PSGL-1, carrying amino acids and post-translational modifications important for selectins binding, as described i.e. in Cummings R D, Brazilian Journal of Medical and Biological research, 1999, 32:519-528) and which is soluble in aqueous media, such as buffered solutions with a pH not below 6.5, i.e. the conditioned media from CHO cells.

The presence of PSGL-1 and its chimeras can be monitored in complex mixtures (defined ahead), as well as in crude purification material (i.e. partly purified material (such as eluted chromatographic fractions) by immunoassays (ELISA, RIA, Western-blots, SPR and the like) with commercial α-PSGL-1 antibodies, or by physical separation methods (such as HPLC, RP-HPLC, SDS-PAGE) on the basis of either the immunological characteristics or the Molecular Weight, Retention time on a specific column and other physical properties of the recombinant molecule.

In the present context, with reference to chromatography, solid support, solid phase or matrix are used interchangeably to indicate the stationary phase of a chromatography where, typically, the target protein is in the mobile phase and, first, by flowing through it, it is adsorbed to the stationary phase, then, by changing conditions, it is released.

Chromatography is carried out according to a preferred embodiment of the invention, on a solid matrix as such or eventually slurried, for example, in water, which is applied to a column, such as for instance a chromatographic column among those commonly used in organic synthesis. A commercially available resin pre-packed column is employed as well. Before its use, the resin (or the pre-packed column) may be optionally treated to remove possible impurities that may leach from the column and collect in the eluant, by using procedures known in the art, such as, e.g., multiple washings, i.e. with water.

The column is thus treated, for example, by gravity or by modified pressure elution, or by a suitable pump, with a buffer according to the manufacturer's instructions for a proper frame of time and at a monitored flow rate. These conditions should enable the matrix to afterwards reversibly adsorb the protein, typically by ionic bonds, so to constitute a protein-loaded solid matrix.

Unless stated otherwise, "proper frame of time" means that the elution (or, in case, multiple elutions carried out by recycling the same eluted medium) through the column occurs until a desired percent of the matrix, usually above 50% of the theoretical capacity of the resin (according to the resin description leaflets), is bound to the target protein.

The actual amount of the loaded material depends also on the washings and eluting conditions and can be monitored by measuring the target protein of interest in the eluate. Typical elution times lie between about 30 minutes to about 3 hours.

By "flow rate" is meant constant flow rate that can be expressed as linear flow rate (cm/h) and set according to the selected matrix; e.g., ion exchange chromatography is preferably set at about 90 cm/h.

Typically, before each chromatographic run, the stationary phase should be equilibrated according to the manufacturer's instructions, with a buffer matching the solution or medium which has to be loaded for purification. After equilibration, the conditioned media can be loaded onto the column and, after loading, if required, washed with a suitable buffer. An example of a suitable washing buffer is the equilibration buffer itself as well as a different buffer with the same pH buffering range and salt concentration.

For the purpose of the present invention, when the target protein(s) is comprised in a complex mixture, such as a conditioned cell culture medium where it was formerly secreted, or is more generally comprised in a buffer solution, such as a loading or elution buffer, together with contaminants whose presence is unsuitable for the intended use of the target protein, said solutions will be defined in the following as "mixtures" or "complex mixtures", at least until the target protein reaches a purity level suitable for the intended use (i.e. 90%, or preferably 95% for in vivo administration).

The soluble target chimeric protein in the above defined mixtures, or complex mixtures, is separated and purified by binding and desorption to solid phases with different properties, as described in the present invention, where a chromatographic procedure on three different solid phases is performed. Loading and elution from said solid phases is performed by switching the conditions (i.e. the buffer or salt concentrations, the pH etc.) from the "loading" solution to the "eluting" solution. In between "loading" and "elution" of the soluble target recombinant chimeric protein, the solid phase can be washed to remove contaminants (i.e. typically proteins) only loosely bound to it. To remove these, selected buffers with the same composition of the loading buffer or same ions are usually used, as known by the skilled man.

After the washings, which are optional, a liquid composition with the elution buffer is contacted with the target protein loaded matrix, typically by percolation through the column under monitored conditions, for a period of time from about 10 to about 180 min to elute the target protein, with modified buffer conditions (i.e. high salt vs low salt, different pH etc.). This mode is herein defined "positive chromatography".

However, chromatography can be also carried out by allowing contaminants to bind the solid phase, recovering the target protein in the flow-through. This mode is herein defined "negative chromatography" and although seldom used, it may provide interesting results, as in the present invention for the preferred embodiment of the HA chromatography.

DETAILED DESCRIPTION

The present invention refers in its main aspect to a three steps process for the purification of a soluble target protein, acidic in nature, preferably comprising N-terminal portions of PSGL-1, said process based on a strong anion exchange, a hydrophobic interaction and a hydroxyapatite chromatography.

Preferably, the soluble target protein is a chimeric protein comprising at the N-terminus, at least aa 5-16, 1-19, 5-41 or 1-47 of SEQ ID NO: 1 where amino acid 1 represents the first amino acid of the mature PSGL-1 protein, corresponding to aa 42 of the GenBank record Acc. N. Q14242.1 (PRI 2 Nov. 2016) and is Gln (Q). Preferably, the P-selectin binding region comprises or consists of aa 1-47 of the mature PSGL-1, as indicated in SEQ ID NO: 1.

According to a preferred embodiment, the chimeric target protein comprises at the N-terminus at least aa 1-19 or, more preferably, aa 1-47 of mature PSGL-1; furthermore, it comprises a covalent dimerization domain with at least a cysteine and a few flanking amino acids, as defined in the formula below and an amino acid sequence at least 90% homologous or identical to at least aa 187-208 of the Neural Retina Specific Leucine zipper (NRL) protein (NCBI Acc. N: NP_0061681) as a non-covalent dimerization domain. This soluble chimera is herein sometimes also referred to as sPSGL-1-NRL.

More preferably, the Neural Retina Specific Leucine zipper protein (NCBI Acc. N: NP_0061681, PRI 15 Oct. 2016), i.e. the non-covalent dimerization domain, preferably comprises aa 186-209, 185-210, 184-211, 183-212, 182-213, 181-214, 181-215, 186-208, 186-210, 187-208 or any fragment comprising at least aa 187-208 plus additional 1, 2, 3, 4, 5, 6 or 7 flanking amino acids at the N- or C-terminus or both of aa 187-208, taken from region 181-215 of the sequence NP_006168.1.

By "covalent dimerization domain" is meant a short amino acid sequence carrying at least a cysteine available for a disulfide bridge. An example of such covalent dimerization domain is the hinge region of IgG.

The covalent dimerization domain has general formula:

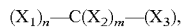

wherein
- $X_1$ and $X_2$ represent any amino acid or amino acid sequence with the exclusion of Cys;
- C is cysteine;
- $X_3$ is any amino acid and
- n and m are integer numbers comprised from 1 to 6.
- $X_1$ preferably comprises Proline and/or Histidine and/or Threonine.

More preferably, $X_1$ comprises a Proline and a Histidine or a Histidine and a Threonine or a Proline and a Threonine.

According to a preferred embodiment, $X_1$ comprises a Proline, a Histidine and a Threonine, preferably in this order; n is at most 5; and $X_2$ is or comprises Proline.

According to another preferred embodiment, $X_2$ is Pro-Pro and $X_3$ comprises Cysteine and at least a Proline.

More preferably, the covalent dimerization domain is the IgG1 Hinge region, or functional fragments thereof, corresponding to aa 48-55 of SEQ ID NO: 1.

In a more general embodiment, the covalent dimerization domain is defined by residues 15-17 of SEQ ID NO: 2.

SEQ ID NO: 1 represents the preferred embodiment of the soluble PSGL-1-NRL chimeric target protein, while SEQ ID NO: 2 represents a more general formula of the soluble PSGL-1-NRL chimeric target protein.

The chimeric protein further preferably comprises a spacer at the C-term, said spacer comprising at its C-terminus a residue suitable for covalent chemical conjugation with other molecules and/or chemical moieties, such as imaging and/or therapeutic moieties. Exemplary amino acids for chemical conjugation are cysteine and lysine. The spacer is about 4-20 amino acids in length and comprises one or more amino acid selected from the group consisting of: Gly, Ser, Pro, Ala, Val, Leu and it carries a cysteine or a lysine at its C-terminus, preferably in the penultimate position. The spacer is preferably a poly-glycine embedding an alanine or other neutral amino acid, such as valine or similar and it carries a cysteine or a lysine, preferably a lysine, followed by Gly, Ser, Pro, Ala, Val, Leu, preferably Gly. A preferred spacer has sequence corresponding to aa 91-99 of SEQ ID NO: 1 and further comprises residues 100 and 101 for proper chemical reactivity in conjugation reactions. However, the sequence of aa 91-99 represents only an exemplary embodiment of the spacer, as other aa sequences may be designed by the skilled artisan which may be equally suitable for the purpose. In fact, a more general embodiment of the spacer is defined by the features of residue 42, preferably in combination with the features of residues 43 and/or 44 of SEQ ID NO: 2.

The most N-terminal portion of SEQ ID NO: 1 and SEQ ID NO: 2 is represented by N-terminal portions of the PSGL-1 protein, which provide a net negative charge due to the presence of at least 3 or more sulfations at tyrosines in positions 5, 7 and 10 (same positions of the mature natural PSGL-1 protein).

Sulfation in a protein refer to the substitution of at least one hydroxyl group (—OH) with —$SO_4H$ on or between amino acid(s) contained within the target protein.

In nature, PSGL-1 is a highly post-translationally processed protein: it is glycosylated, in particular it comprises, when properly post-translationally processed, O-linked glycans at threonine residue in position 16; O-linked glycans typically comprise sugar residues such as N-acetylgalactosamine (GalNac), N-acetylglucosamine (GlcNAc), fucose, glucose, galactose, mannose (Man), hexose, xylose, sialic acid or mixtures thereof.

The O-linked glycans typically present on the PSGL-1 N-terminal portion of the chimeric protein of the present invention are constituted of GalNac, GlcNAc, fucose, sialic acid and galactose. O-linked glycans on PSGL-1 are preferably sialylated and fucosylated and preferably consist of sialyl Lewis X glycan structure (sLe$^x$, sialic acid-galactopyranosyl-fucose-N-acetylglucosamine) bound to threonine residues, i.e. to Thr$^{16}$. Post-translational modifications of the natural and recombinant PSGL-1 have been described in R. D Cumming, Braz. J. Biol. Res., 1999, 32(5): 520-528 and D. Sako, Cell, 1995, 83: 323-331. Of note, the PSGL-1 protein is usually present as a dimer, wherein each monomer is covalently linked by at least one disulfide bridge to the other.

According to the definitions given above, in the present invention AE and HI chromatography are carried out in a positive mode, while HA can be performed either by positive or negative mode, even though HA negative chromatography with a target protein recovered in the flow through, in the conditions given ahead, is preferred.

For the purification process according to the present invention, after having recovered the supernatant from the recombinant cell line, preferably a CHO cell where this protein is stably expressed, i.e. the "cell conditioned media", this is preferably filtered on 0.45 or 0.22 μm porous membrane (i.e. nitrocellulose or other material) or centrifuged to remove cells and cellular debris.

The cell culture medium is usually a eukaryotic serum-free medium, such as EXCEL CHO, OptiCHO™ (LifeTechnology), ActiCHO™ by GE/PAA, FortiCHO™ (by Thermo Fisher Scientific), CellVento™ CHO 200 and CellVento™ CHO 220 by Millipore, 83836C by SAFC, BalanCD™ by Irvine, whose composition is undisclosed or the like) and comprises Glutamine (or the analogue GlutMax™) 10 mM, preferably 4-8 mM.

Furthermore, before being loaded onto the stationary phase for chromatography, the conditioned medium should also be brought to a pH value comprised from about 6.5 to about 8, preferably from 6.8 to 7.8 or more preferably comprised from 7.2 to 7.6, typically about 7.5, which may be adjusted by addition of a proper amount of a base or an acid, such as, for example, an alkaline base or the like, as the conditioned medium is usually acidic, to it.

Furthermore, for AE chromatography it is also important, for example, to monitor the medium conductivity of the cell-conditioned medium, which should preferably be below 30 mS/cm, more preferably below 20 mS/cm, even more preferably below 10 mS/cm.

Then, the first anion-exchange (AE) chromatography is performed on an anion-exchange stationary phase. The stationary phase comprises functional groups which are anion-exchanger, preferably strong anion-exchanger, more preferably quaternary ammonium. A preferred resin is Capto Q™ (GE), i.e. a cross-linked, beaded-form of agarose with quaternary ammonium functional groups. An alternative matrix is the styrene/divinylbenzene carrying the same functional groups.

Prior to loading the conditioned and filtered medium onto the AE solid-phase column, this is typically equilibrated with a suitable buffer, which has usually the same composition of the loading buffer. An example of a suitable buffer is a Tris buffer in concentration comprised between 5 mM and 30 mM with a pH comprised from about 6.5 to about 8, more preferably from 6.8 to 7.8, more preferably from 7.4 to 7.8, or about 7.5. The buffer may contain salts in low concentration, i.e. below 0.3 M NaCl or KCl, preferably below 0.1 M NaCl or KCl, more preferably below 5 mM NaCl or KCl.

Alternative equilibration/loading/washing buffers are: Tricine (pH range: 7.4-8.8), Triethanolamine (pH range: 7.3-8.3), HEPES (pH range: 7.0-8.0). Further alternative buffers are the following: TES (pH range: 7.2-7.8), MOPS (pH range: 6.5-7.9), phosphate (pH range: 6.7-7.6) with a low salt concentration, wherein said salts are preferably NaCl or KCl, in concentration below 0.3 M NaCl or KCl, preferably below 0.1 M NaCl or KCl, more preferably below 5 mM NaCl or KCl.

Loading onto the AE is carried out at speed of 10-90 cm/h, preferably 60-90 cm/h, more preferably 80-90 cm/h.

Elution of the bound molecules from AE is achieved either by isocratic elution or positive gradient elution by increasing concentration of the saline solution up to 1M. A typical gradient elution for the PSGL-1 Variant 1A comprises increasing concentrations of a monocationic salt, preferably NaCl or KCl in Tris or phosphate buffer 5-30 mM, preferably 15-25 mM. Preferred elution conditions are gradient from 0 to 100% of elution buffer in 10 column volumes. i.e. 0-100% 1 M NaCl in 20 mM Tris.

When elution is performed by isocratic steps, typical elution steps are at least three: a few column volumes (CV) (i.e. 3-4 are usually suitable) each of increasing salt concentration solutions comprising the monocationic salt starting from, i.e. a concentration of 20-40%, preferably 25-35%, more preferably 28-33% as the first step (i.e. about 30%), a 41-80%, more preferably 50-70% even more preferably 55-65% (i.e. about 60%) as the second step and a 81-100%, more preferably 90-98% or about 100% as the third step if needed of a 1 M solution of a monocationic salt (i.e. NaCl) in Tris 5-30 mM (20 mM) with pH close to neutrality.

According to a preferred embodiment, the AE column is eluted with 2-steps of a 20% to 40%, preferably 25% to 35%, more preferably about 30% and (90-100%), more preferably 100% of a 20 mM Tris pH 7.5, 1 M NaCl solution. The two steps elution represents thus a clear advantage of the present process over standard AE eluting conditions.

The result of the first AE chromatography, as determined by RP-HPLC is a complex mixture where the target protein is still contaminated by more than 95% of the total DNA present in the conditioned medium and more than about 40% of the total proteins, thus requiring further purification.

Purification and effective recovery of the target protein from the chromatography can be monitored in different ways, i.e. by detecting the protein of interest in the chromatographic fractions or in the flow-through by different analytical methods, which may be selected according to the elution methods used: i.e. when elution is performed by gradient, the fractions can be analyzed by immunochemical methods (e.g. western blot, RIA, ELISA or SPR) by using a suitable antibody, in order to detect the fractions containing the target protein. An example of a suitable antibody is the mouse anti-PSGL-1 IgG (Merck).

Residual DNA in the eluted fractions can be monitored by commercial assays, such as DNA Quantitation Kit, Fluorescence Assay (Sigma).

As a matter of fact, recombinant PSGL-1 fusion proteins, exemplified for the present process by the sPSGL-1-NRL Variant 1A (SEQ ID NO: 1), is highly negatively charged and behaves on the AE resin similarly to other biomolecules such as, of course, other acidic proteins and nucleic acids.

It follows that for acidic proteins such as the extracellular soluble portion of PSGL-1 DNA, among contaminants, represents a problem more than it is for basic proteins as they are both endowed with the same negative charges.

In fact, EP 1681298 and EP 1681299 deal with the purification of recombinant soluble forms of PSGL-1 and the technical problem of removing contaminating DNA from the protein of interest. The goal is said to be achieved by an anion exchange chromatography, followed by a hydrophobic interaction solid phase chromatography and by either washings with a high-salt, hydroalcoholic solution, or alternatively, by a metal chelate chromatography.

Takada, who is silent on this issue, discloses the purification of the soluble form of PSGL-1 from the conditioned medium of recombinant CHO cells by an Anionic Exchange (AE) chromatography, followed by HA and by Size exclusion chromatography (SEC). Neither the purity nor the yields achieved with this method are disclosed.

According to the present invention, after AE chromatography, the salt concentration of the AE pooled eluted fractions is brought to a high salt concentration, i.e. a salt concentration comprised from 2 M to 5 M, more preferably from 3.5 to 4.5 M, typically about 4M, with solid NaCl for the loading on the next Hydrophobic Interaction column. Alternative salts are ammonium sulfate, potassium sulfate or potassium chloride in concentrations known to skilled artisan. Preferably the pH is also adjusted to a neutral, i.e. around 7.5, by adding a base or an acid as needed. Before chromatography, the HI column is equilibrated with a suitable buffer with high salt concentration. An example of a suitable buffer is a TRIS/NaCl buffer or Phosphate/NaCl buffer, with pH comprised from 7 to 8, preferably 7.5, 4M NaCl. Alternative salts to NaCl are ammonium sulfate in concentration typically comprised from 1 M to 2 M or potassium sulfate in concentration typically comprised from 1 M to 3 M.

Hydrophobic interaction (HI) chromatography is carried out, as defined above, on a stationary phase with hydrophobic functional groups. Examples of hydrophobic functional groups are: butyl, octyl or phenyl groups. A preferred stationary phase is Phenyl Sepharose™ (GE) with phenyl groups as functional groups. Other commercial resins can be used, such as octyl- or butyl-Sepharose™, preferably Capto Butyl™ (GE). An alternative resin matrix is the styrene/divinylbenzene with the same butyl or phenyl functional groups.

Washings are usually performed with a buffer solution with the same composition of the loading solution, i.e. with a high salt solution, having a salt concentration comprised from 2 M to 5 M, more preferably from 3.5 to 4.5 M, typically about 4M NaCl. As in the loading solution, alternative salts such as ammonium sulfate, potassium sulfate or potassium chloride in concentrations known to skilled artisan are also contemplated. Concentration of the buffering system is typically below 100 mM and pH is adjusted to a neutral value as defined above.

Usually from 1 to 5 column volumes of the loading buffer are used for washings, preferably 2-4 column volumes.

During HI chromatography, the high salt concentration of the loaded solution promotes interaction of the recombinant protein with the hydrophobic functional groups. By this chromatography, nucleic acids and other contaminants are collected in the flow-through fraction while the target recombinant protein is bound to the stationary phase.

The protein is eluted by lowering the salt concentration, i.e. NaCl, below 2.5 M in case of buffers comprising NaCl, more preferably below 3.5 M, or including in the buffering system organic modifiers such as a lower alcohol ($C_1$-$C_4$), as known to the skilled artisan.

A suitable elution buffer is a buffer used for column equilibration before loading of the mixture with the target protein. It comprises a much lower salt concentration than the buffer used for HI elution or it does not comprise salts at all. A preferred suitable elution buffer is Tris or Phosphate buffer with a pH comprised from 7 to 8, preferably 7.5.

A low salt buffer elution can be performed either by gradient or isocratic steps. If the elution is performed by gradient, the fractions are typically analysed by SDS-PAGE or by an immunochemical method as described above, in order to detect fractions containing the target protein, while the reproducibility of the isocratic step elution allows not to necessarily carry out the immunochemical analysis.

Typically after HIC, the purity of the target protein from other proteins is not higher than 70-75% and the residual DNA content is still about 5%.

Then, as the last chromatographic step, a hydroxyapatite (HA) column chromatography is performed.

Hydroxyapatite (HA) has both positively and negatively charged groups and has been described for both the purification of acidic proteins that bind to it through C-sites (calcium groups) as well as for basic proteins, that binds through P-sites (phosphate groups). HA has also affinity for DNA which is negatively charged due to the phosphate groups in the nucleic acid backbone. HA is in fact also used for DNA purification from complex composition of matter such as cellular lysates.

However, even if HA interaction mode has been characterized and although quite diffused for the purification of recombinant proteins, the behavior of hydroxyapatite in a chromatographic process is not easily predictable for all proteins and contaminants.

In the field of recombinant protein purification, HA chromatography has been described, in combination with other chromatographic steps, to remove high-molecular weight protein aggregates i.e. in U.S. Pat. No. 8,058,407 or purify complex molecules such as virus-like particles, as disclosed i.e. in EP 1893751.

To the best of the Applicant's knowledge for soluble PSGL-1 proteins, HA chromatography has been described only in Takada (cited above), where it requires afterward a Size Exclusion Chromatography (SEC). SEC, is however, not easily scalable-up and thus not suitable for industrial applications.

Several hydroxyapatite chromatographic resins are commercially available. Hydroxyapatite in any form is suitable for the purpose of the invention, ceramic HA is preferred, available as Type I or Type II resin wherein the Type II is preferred (commercially available i.e. from Bio-Rad, as CHT™).

Before the HA chromatography, the HI eluate is prepared by adjusting the salt and buffer type and concentrations, in order to achieve a very low salt and phosphate concentrations. These conditions are usually achieved by diafiltration against a suitable buffer which typically has the same composition of the loading buffer, or dilution of the former chromatography eluate with a very low salt and phosphate ions solution, typically water. Examples of low salt and phosphate buffers according to the invention are 2-10 mM phosphate buffer, with pH comprised from 6.5 and 8, more preferably comprised from 6.6 and 7.4, even more preferably comprised from about 6.7 to about 7.2. In a preferred embodiment, the pH is about 6.8 and the phosphate buffer may comprise, and preferably does, low $CaCl_2$ or $MgCl_2$ concentrations, or Tris 1-20 mM.

Therefore, in order to carry out the Hydroxyapatite (HA) chromatography, the hydrophobic interaction eluate, diluted or diafiltered, is preferably added with a divalent cation, more preferably $CaCl_2$ in concentration preferably below 1 mM, or preferably below 0.5 mM, more preferably about 0.3 mM (ranges which include intermediate and limit values). Hydroxyapatite chromatography according to the present invention requires a suitable loading buffer, i.e. a low concentration phosphate and low concentration NaCl buffer, with pH comprised from 6.5 to 8, more preferably comprised from 6.6 to 7.4, even more preferably comprised from about 6.7 to about 7.2. In a preferred embodiment the pH is about 6.8. The low salt and phosphate buffer conditions are achieved preferably by diafiltration, preferably carried out against the HA loading buffer in a suitable ultrafiltration device. Examples of suitable devices are: a stirred ultrafiltration unit, a tangential flow cassette or a hollow fiber cartridge. Alternatively, the HI chromatography eluate can be suitably diluted, i.e. with water, up to 2-10 fold. Preferred dilution fold is about 4 to 5.

The target protein is purified by hydroxyapatite (HA) chromatography either by the negative (the target protein is found in the flow-through while contaminants bind to the stationary phase) or positive elution (the target protein binds to the stationary phase) chromatography. In the negative elution chromatography further analysis are not required in order to detect the fractions which contain the target protein, because this is always found in the Flow-Through. This chromatography is preferred and provides higher purity target protein. Furthermore, it is highly reproducible and easier to carry out, as it does not require column washings. The high reproducibility of the whole process comprising HA allows this process to be completely automated, which represents a great advantage for an industrial process.

In the negative HA chromatography the chimeric target protein carrying the soluble form of PSGL-1 at the N-terminus is recovered in the flow-through (FT) after loading in phosphate buffer having low concentration, i.e. 2-15 mM, preferably 5-10 mM of phosphate ion, and pH comprised from 6.5 and 8, more preferably comprised from 6.6 and 7.4, even more preferably comprised from about 6.7 to about 7.2, and further comprising low concentration $CaCl_2$, preferably about 0.3 mM of $CaCl_2$. In a preferred embodiment, the pH is about 6.8.

Alternatively, in the elution (or positive) chromatography, the target protein binds to the stationary phase in a suitable buffer and is thereafter eluted by changing the salts and/or phosphate conditions. An example of suitable buffer is phosphate/$CaCl_2$ or phosphate/$MgCl_2$ buffer with a pH comprised from 6.5 and 8, more preferably from 6.6 and 7.4, even more preferably from about 6.7 to about 7.2. In a preferred embodiment the pH is about 6.8. Concentration of phosphate ions is preferably below 5 mM, even more preferably below 4, 3, 2, 1, 0.1, 0,01, 0,001 mM.

In the positive chromatography, elution can be achieved by increasing the phosphate buffer concentration, preferably above 15 mM, and comprising at least 0.3 mM $CaCl_2$ or 1 mM $MgCl_2$, either by gradient or step elution.

Alternatively, the target protein can be loaded on HA also in low concentration Tris (i.e. 1-10 mM Tris), preferably comprising $MgCl_2$ in concentration below 1.2 mM, preferably about 1 mM. In this case, it is preferably eluted in higher phosphate ion concentration buffer, preferably higher than 15 mM and comprised from 16-30 mM, preferably about 20 mM phosphate ions. These eluting conditions can be achieved, i.e. by a 0-12.5% gradient of 500 mM phosphate buffer.

It should be noted that "therapeutic grade" purity from contaminating DNA and proteins (typically: contaminating DNA ≤2% and ≥95% purity from other proteins) can be achieved with both the "positive" and "negative" HA chromatography.

In fact, processes comprising HA as the last purification step allow achieving purity of the PSGL-1 higher than 95%, preferably of more than 96%, 97%, 98% or 99% from other proteins and free of contaminating DNA, as measured i.e. by commercial DNA quantitation assays, such as the DNA Quantitation Kit, Fluorescence Assay (Sigma).

As for the final yields, the target protein is recovered with yields well above 50% of the total target protein content, typically above 60% and generally about or above 70%. These yields represent a good result and, most importantly for an industrial process, they are quite standardized and highly reproducible.

The high reproducibility of the whole process as claimed in all its embodiments, allows this to be completely automated, which represents a great advantage for an industrial process.

As a comparison of the results achieved with the present process, US2008/0274501 describes HA chromatography as the final "polishing" step for an acidic protein after HI chromatography, from complex mixtures (transgenic tobacco cells) overexpressing the target protein. Final yields reported for the recovery of the target protein are well below 50% of the initial protein content, thus much lower than those typically achieved by the process of the present invention for the target protein.

The invention and its particular embodiments described in the following are only exemplary and not to be regarded as a limitation of the present invention: they show how the present invention can be carried out and are meant to be illustrative without limiting the scope of the invention.

EXPERIMENTAL PART

Example 1: Preparation of the PSGL-1 Variant 1A for Preliminary Studies

The PSGL-1-NRL chimeric protein Variant 1A (SEQ ID NO: 1) was produced in CHO—S cells (Freedom™ CHO—S™ Kit Manual—Cat.N A13696-01 Lifescience Thermofisher Scientific, July 2015) co-expressing the DNA sequence encoding the core 2 beta-1,6-N-acetylglucosaminyltransferase (C2GnT-M) and the FTVII (fucosyl-transferase VII) according to Fugang Li et al., J. Biol. Chem, 1996, 271:3255-3264.

CHO—S clones were allowed to grow for at least 7 days in OptiCHO™ medium.

The supernatant was collected, filtered on 0.2 μm PES membrane and loaded onto a strong anion exchange Capto Q column (GE 17-5316-02, 1.6×6 cm, 12 mL) previously equilibrated with 20 mM TRIS-HCl pH 7.5.

The bound proteins were eluted with a linear gradient of up to 1 M NaCl over 8 column volumes. The eluted fractions containing the chimeric target protein as identified by SDS-PAGE, were used for a second Phenyl hydrophobic interaction chromatography purification step.

NaCl was dissolved in the pooled fractions to a concentration of 4 M. This pool was then loaded on 1 mL HIC column (HiTrap Phenyl HP™, GE Healthcare Life Sciences, Catalog #17-1351-01). Elution was achieved by linearly decreasing the sodium chloride concentration to zero in 10 column volumes. Fractions containing the target protein were identified by SDS-PAGE analysis and pooled together for a third size exclusion chromatography (SEC) step. The SEC column (HiLoad 16/600 Superdex 200™ pg, GE Healthcare Life Sciences, Catalog #28-9893-35) was pre-equilibrated with 20 mM Tris-HCl pH 7.5, 150 mM NaCl, used as the mobile phase. Fractions containing the chimeric target protein Variant 1A as shown by SDS-PAGE analysis were pooled and concentrated (Amicon Ultra Centrifugal Filter Unit, EMD Millipore).

Western Blot analysis of the purified protein was performed with Phast-System (GE) as described in the instruction manual. Nitrocellulose membrane was saturated with PBS+1% BSA (1 h at room temperature). The membrane was incubated 1 h at room temperature with PBS+0.5% Triton X-100+1% BSA containing an anti-P-Selectin Glycoprotein Ligand-1 antibody 1:1000 (anti-P-Selectin Glycoprotein Ligand-1 Antibody, clone KPL-1, EMD Millipore, cod. MAB4092). The membrane was incubated with anti-mouse IgG—HRP as secondary antibody and the signal developed with ECL, showing positive anti-PSGL-1 antibody recognition, appeared as a single band at approximately 60 kDa, which shifted at about 30 kDa under reducing conditions, as expected.

Peptide mapping (PMAP) was used to elucidate the post-translational modifications (PTMs) of the chimeric glycoprotein, including sulfation and N— and O— glycosylation. To this aim, both Chymotrypsin and Asp-N were used for protein digestion, followed by LC-MS Liquid Chromatography-Mass Spectrometry.

The analytical assays carried out on the purified recombinant Variant 1A allowed the following conclusions:
the N-term structure of the PSGL-1 Variant 1A glycoprotein is dominated by the pyroglutamic form pQATEY-EYL (SEQ ID NO: 3).
the dimeric character of the PSGL Variant 1A was confirmed by the presence of $(M+2H)^{+2}=728.5$ attributed to the $(^{50}TCPPCPL^{56})_2$ sequence (SEQ ID NO: 4). Ions corresponding to the monomeric form of this peptide were not detected, suggesting that PSGL Variant 1A is entirely in the dimeric form.

the structure of the O-glycan residues on Thr$^{16}$ was confirmed: in fact, the expected Sialyl-Lewis-X motif, a Core 2 structure comprising N-Acetylgalactosamine, N-Acetylglucosamine, galactose, fucose and sialic acid was identified.

sulfation of Tyrosines 5, 7 and 10 was demonstrated by mass spectrometry in the negative scan mode.

Therefore, Variant 1A (SEQ ID NO: 1) comprises all the features necessary for a proper binding to (human) selectins.

Example 2: Purification of PSGL Variant 1A by AE/HIC/HA (Negative)

600 mL of Conditioned Medium from a single CHO clone was filtered on 0.22 μm membrane and loaded onto AEX column (Capto Q™, GE, 2.6×7 cm, 37 mL) equilibrated with 20 mM TRIS pH 7.5. The bound proteins were eluted with 2 step elution at 30% and 100% of 20 mM TRIS, 1 M NaCl, pH 7.5. The target protein was eluted in the 100% fraction. The column was cleaned with 1 M NaOH, and stored at 4° C. in 20%. EtOH. Conductivity of the conditioned medium was below 10 mS/cm.

Solid NaCl was added to the pool from the 100% elution step of the AEX purification to a final concentration of 4 M. The sample was divided in two parts in order not to overload the column. Then it was loaded on a hydrophobic interaction chromatographic column (Phenyl Sepharose™, GE, 1.6×9 cm, 18 mL volume) previously equilibrated with 20 mM TRIS, 4 M NaCl, pH 7.5. The bound proteins were eluted with 2 steps at 50% and 100% of 20 mM TRIS pH 7.5. The target protein was eluted in the 50% fraction.

After the second run, the column was cleaned with 0.2 M NaOH and stored at 4° C. in 20% EtOH.

The pools from the first elution step in the two HIC runs were combined and the phosphate/CaCl$_2$ concentrations were adjusted to 10 and 0.3 mM, respectively, by addition of 500 mM phosphate pH 6.8 and 1 M CaCl$_2$. The pool was then diafiltered against 10 mM Phosphate, 0.3 mM CaCl$_2$, pH 6.8 in an Amicon™ ultrafiltration stirred cell (Merck, assembled with membrane YM10, with 10 kDa nominal molecular weight cut off). Then, the diafiltered pool was loaded onto a Hydroxyapatite column (BioRad, 2.2×5 cm, 19 mL volume) previously equilibrated with 10 mM Phosphate, 0.3 mM CaCl$_2$, pH 6.8. The PSGL Variant 1A was eluted in the FT fraction (negative chromatography).

The FT fraction was concentrated with Amicon™ Centrifugal Filter Unit, according to manufacturer's instructions. The purified protein was frozen at −40° C. The final concentration was 0.89 mg/mL for a total yield of 38.7 mg (73%) and a purity of 99.7% (FIG. 1).

Residual DNA and other protein contaminants were measured after each chromatographic step, by a DNA quantitation assay (DNA Quantitation Kit, Fluorescence Assay, Sigma, detection limit 2 mg/L) and RP-HPLC (purity vs other proteins), respectively.

Values are summarized in the following table:

| Purification Step | PSGL Variant 1A Purity by RP-HPLC | Residual DNA content |
|---|---|---|
| Anion exchange | <58% | 97% |
| Hydrophobic Interaction | 72.6% | 2% |
| Hydroxyapatite | 99.3% | Below the detection limit |

Example 3: Purification of PSGL Variant 1A by AE/HIC/HA (positive)

1000 mL of Conditioned Medium was filtered on 0.22 μm membrane and loaded onto AEX column (Capto Q™, GE, 2.6×7 cm, 37 mL) equilibrated with 20 mM TRIS pH 7.5. The bound proteins were eluted with 2 step elution at 30% and 100% of 20 mM TRIS, 1 M NaCl, pH 7.5. The target protein was eluted in the 100% fraction. The column was cleaned with 1 M NaOH, and stored at 4° C. in 20% EtOH.

Solid NaCl was added to the pool from the 100% elution step of the AEX purification to a final concentration of 4 M. The sample was divided in two parts in order not to overload the column. Then it was loaded on a hydrophobic interaction chromatographic column (Phenyl Sepharose™, GE, 1.6×9 cm, 18 mL volume) previously equilibrated with 20 mM TRIS, 4 M NaCl, pH 7.5. The bound proteins were eluted with 2 steps at 50% and 100% of 20 mM TRIS pH 7.5. The target protein was eluted in the 50% fraction.

After the third run, the column was cleaned with 0.2 M NaOH and stored at 4° C. in 20% EtOH.

The pools from the first elution step of each HIC runs were combined and diluted 4-fold with water. Then, the diluted pool was loaded onto a Hydroxyapatite column (BioRad, 2.2×5 cm, 19 mL volume) previously equilibrated with 5 mM Phosphate, 1 mM MgCl$_2$, pH 6.8. The bound proteins were eluted with a gradient from 0-12.5% of 500 mM phosphate buffer. The PSGL Variant 1A was eluted as the first peak.

The fractions containing the target protein were concentrated with Amicon Centrifugal Filter Unit (Ultracel-10 membrane, 10 kDa MWCO), according to the manufacturer's instructions.

Figure 2:
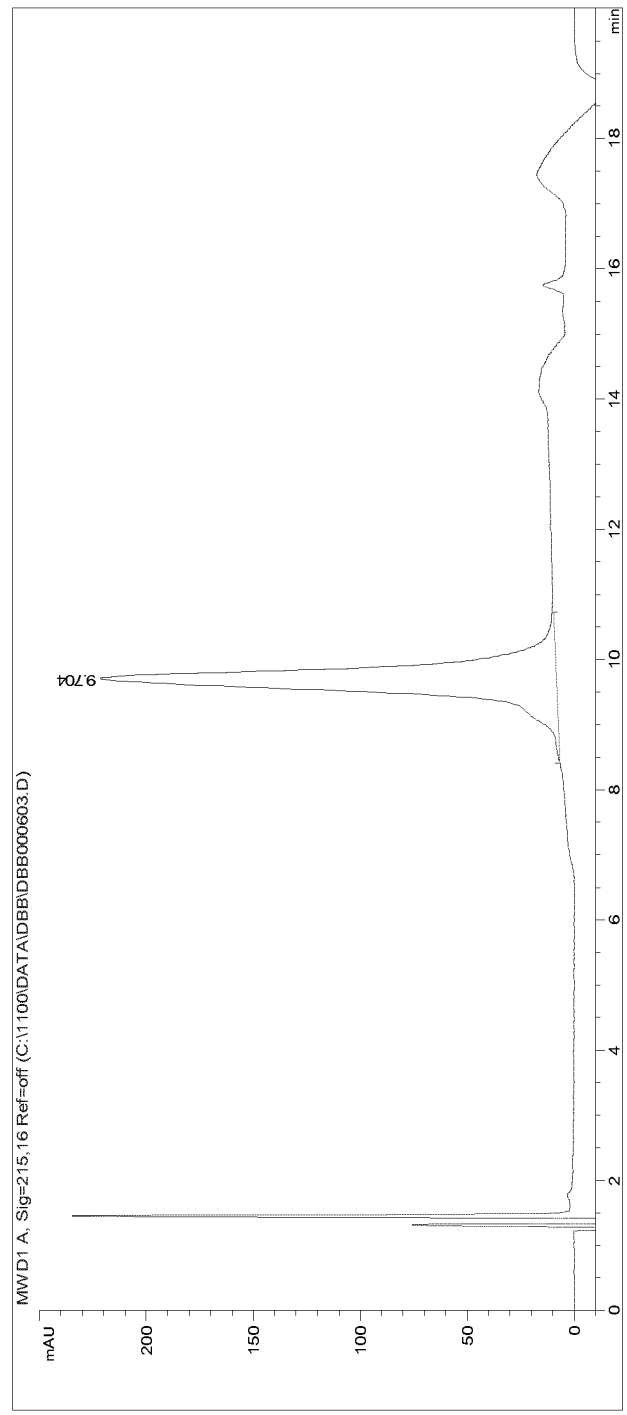
FIG. 2. RP-HPLC analysis, at 215 nm, of the final pool of fractions after HA purification of example 3. The Retention time (Rt) of the target protein is about 9.7 min.

The purified protein was frozen at −40° C. The final concentration was 1.09 mg/mL for a total yield of 25 mg, corresponding to about 70% of the total target protein content and a purity of 98.7% (FIG. 2).

Example 4: Purification of PSGL Variant 1A by AE/HA/SEC. Comparative

The method is described in Takada (cited in the Background Art). 200 mL of Conditioned Medium was filtered on 0.22 μm membrane and loaded onto AE column (Capto Q™, GE, 2.6×7 cm, 37 mL) equilibrated with 20 mM TRIS pH 7.5. The bound proteins were eluted with 2 step elution at 30% and 100% of 20 mM TRIS, 1 M NaCl, pH 7.5. The target protein was eluted in the 100% fraction. The column was cleaned with 1 M NaOH, and stored at 4° C. in 20% EtOH.

The 100% elution step fraction was concentrated and diafiltered with Amicon Centrifugal Filter Unit (Ultracel-10 membrane, 10 kDa MWCO), according to manufacturer's instructions, against 25 mM Tris, 1 M NaCl, 1 mM CaCl$_2$, pH 7.4. The concentrated material was loaded onto a Hydroxyapatite column (BioRad, 2.2×5 cm, 19 mL volume), previously equilibrated with 25 mM Tris, 1 M NaCl, 1 mM CaCl$_2$, pH 7.4. Elution was performed using 30 mM phosphate, 150 mM NaCl, pH 7.4.

The eluate was concentrated to 5 mL with Amicon Centrifugal Filter Unit (Ultracel-10 membrane, 10 kDa MWCO), according to the manufacturer's instructions, and run through a Sephacryl S-200 HR™ (GE Healthcare, 2.2×88 cm, 334 mL) equilibrated in PBS, pH 7.2. Collected fractions were analysed by western blot. Western Blot analysis was performed with Phast-System (GE) as described in the instruction manual. Nitrocellulose membrane was saturated with PBS+1% BSA (1 h at room temperature). The membrane was incubated 1 h at room temperature with PBS+0.5% Triton X-100+1% BSA containing an anti-P-Selectin Glycoprotein Ligand-1 antibody 1:1000 (anti-P-Selectin Glycoprotein Ligand-1 Antibody, clone KPL-1, Merck).

After 3 washes with PBS+0.5% Triton X-100 the membrane was incubated with anti-mouse IgG—HRP as secondary antibody.

After 3 washings, the HRP signal was developed with ECL, showing positive anti-PSGL-1 antibody recognition.

Figure 3:
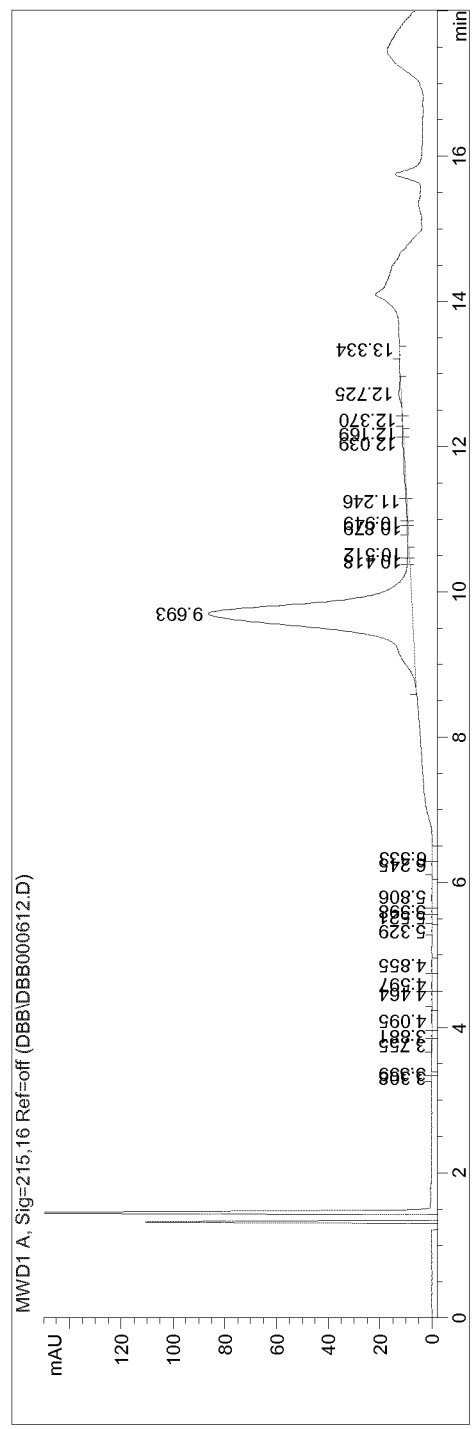
FIG. 3. RP-HPLC analysis, at 215 nm, of the final pool of fractions after HA purification of example 4. The Retention time (Rt) of the target protein is about 9.7 min.

The purified protein was frozen at −40° C. The final concentration was 0.2 mg/mL for a total yield of 4.89 mg (62.9%) and a purity of 94.8% (FIG. 3).

The results indicate lower yields and most importantly, a lower degree of purity of the target protein Variant 1A achieved with the prior art method.

---

The invention claimed is:

1. A method for purifying a target soluble protein comprising the mature extracellular domain of P-Selectin Glycoprotein Ligand-1 (PSGL-1 GenBank Acc. N. Q14242.1) at the N-terminus, said method comprising submitting a mixture comprising said target soluble protein to:
   a) a strong anion exchange (AE) solid-phase chromatography,
   b) a hydrophobic interaction (HI) solid-phase chromatography and
   c) a hydroxyapatite (HA) solid-phase chromatography,
   in the above indicated order, wherein the target soluble protein has the amino acid sequence of SEQ ID NO.: 1 or SEQ ID NO.: 2.

2. The method according to claim 1 wherein said strong anion exchange solid-phase chromatography comprises loading the mixture comprising the target soluble protein on a strong anion exchange solid-phase in combination with a buffer selected from the group consisting of: Tris, Tricine, Triethanolamine, HEPES, TES, MOPS and phosphate.

3. The method according to claim 2 wherein the buffer is Tris or phosphate in a concentration lower than 30 mM and with a pH from 6.5 to 8.

4. The method according to claim 2 further comprising the elution of the target soluble protein from said strong anion exchange solid-phase with a NaCl or KCl saline solution under isocratic elution or positive gradient elution by increasing concentration of the saline solution up to 1M.

5. The method according to claim 4 wherein the mixture comprising the target soluble protein eluted from the AE is loaded onto the hydrophobic interaction solid-phase in a loading buffer comprising a salt in a high concentration wherein the salt is selected from the group consisting of: NaCl, ammonium sulfate and potassium sulfate, and wherein the high salt concentration comprises from 2 M to 5 M.

6. The method according to claim 5 wherein the buffer is Tris in a concentration lower than 100 mM and the salt is NaCl.

7. The method according to claim 6 wherein in said Tris buffer the NaCl concentration is from 3.5 M to 5 M.

8. The method according to claim 1 wherein said hydrophobic interaction solid-phase is a phenyl-hydrophobic solid-phase.

9. The method according to claim 8 further comprising elution of the target soluble protein from the hydrophobic interaction (HI) solid-phase by applying a buffer solution wherein the NaCl salt concentration is lower than 2.5 M.

10. The method according to claim 9 wherein the mixture comprising the target soluble protein eluted from the HI is brought to a buffer concentration lower than 15 mM, with a pH from 6.5 to 8, and loaded on a HA solid-phase.

11. The method according to claim 10 wherein said buffer is selected from the group consisting of Tris and phosphate with a pH from 6.6 to 7.4.

12. The method according to claim 10 wherein said buffer is phosphate and comprises $CaCl_2$ in a concentration lower than 0.5 mM.

13. The method according to claim 12 wherein the target soluble protein is found in the Flow-Through after the hydroxyapatite solid-phase chromatography.

14. The method according to claim 10 wherein said buffer is Tris and comprises $MgCl_2$.

15. The method according to claim 14 wherein the $MgCl_2$ is in a concentration lower than 1.5 mM.

16. The method according to claim 14 wherein the target soluble protein is eluted from the hydroxyapatite solid-phase by increasing the phosphate ion concentration above 15 mM.

17. The method according to claim 16 wherein said increase is carried out by a phosphate concentration gradient.

18. The method according to claim 10 wherein the buffer concentration lower than 15 mM and pH from 6.5 to 8 is achieved by dilution or diafiltration.

* * * * *